(12) United States Patent
Balistreri et al.

(10) Patent No.: US 11,242,924 B2
(45) Date of Patent: Feb. 8, 2022

(54) LUBRICANT REGULATING SYSTEM AND AN AXLE ASSEMBLY MADE THEREWITH

(71) Applicant: DANA HEAVY VEHICLE SYSTEMS GROUP, LLC, Maumee, OH (US)

(72) Inventors: Lucas A. Balistreri, Bowling Green, OH (US); Shane T. Smith, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/977,489

(22) PCT Filed: Mar. 1, 2019

(86) PCT No.: PCT/US2019/020212
§ 371 (c)(1),
(2) Date: Sep. 2, 2020

(87) PCT Pub. No.: WO2019/169223
PCT Pub. Date: Sep. 6, 2019

(65) Prior Publication Data
US 2021/0054920 A1    Feb. 25, 2021

Related U.S. Application Data

(60) Provisional application No. 62/637,836, filed on Mar. 2, 2018.

(51) Int. Cl.
*F16H 57/04* (2010.01)

(52) U.S. Cl.
CPC ..... *F16H 57/0423* (2013.01); *F16H 57/0457* (2013.01); *F16H 57/0469* (2013.01); *F16H 57/0483* (2013.01)

(58) Field of Classification Search
None
See application file for complete search history.

(56) References Cited

U.S. PATENT DOCUMENTS

| | | |
|---|---|---|
| 2,040,793 A | 5/1936 | Peterman |
| 4,175,643 A | 11/1979 | Jenkins |
| 4,656,885 A | 4/1987 | Hori |
| 6,997,284 B1 | 2/2006 | Nahrwold |
| 8,109,174 B2 | 2/2012 | Hilker |
| 9,822,869 B1 | 11/2017 | Carr |
| 9,890,848 B2 | 2/2018 | Girardot |

(Continued)

FOREIGN PATENT DOCUMENTS

| | | |
|---|---|---|
| FR | 1453586 | 6/1966 |
| GB | 1115446 | 5/1968 |
| WO | 2017083658 | 5/2017 |

*Primary Examiner* — Colby M Hansen
(74) *Attorney, Agent, or Firm* — Marshall & Melhorn, LLC

(57) ABSTRACT

Provided herein is an axle assembly, including: a carrier housing defining an interior cavity; a pinion shaft rotatably supported in the carrier housing by at least one bearing; a lubricant channel disposed in the carrier housing, the lubricant channel having a first end in fluid communication with the at least one bearing and a second end in fluid communication with the interior cavity; and a lubricant controller at least partially disposed in the lubricant channel, wherein the lubricant controller includes a lubricant capture portion.

17 Claims, 7 Drawing Sheets

(56) References Cited

U.S. PATENT DOCUMENTS

| | | |
|---|---|---|
| 9,989,143 B2 | 6/2018 | Fomison |
| 2010/0304914 A1 | 12/2010 | Barrett |
| 2016/0123455 A1* | 5/2016 | Mikami ................ F16H 57/045 74/467 |
| 2016/0153546 A1 | 6/2016 | Ogawa |

* cited by examiner

LUBRICANT REGULATING SYSTEM AND AN AXLE ASSEMBLY MADE THEREWITH

RELATED APPLICATION

The present application claims the benefit to U.S. Provisional Patent Application No. 62/637,836 filed on Mar. 2, 2018, which is incorporated herein by reference in its entirety.

BACKGROUND

The present disclosure relates to a lubricating regulating system that can be used in an axle assembly. Axle assemblies may utilize a differential apparatus in wheeled vehicle drivetrains to permit an outer drive wheel to rotate at a greater velocity than an inner drive wheel when operating a vehicle through a turn. Axle assemblies often employ a pinion gear drivingly engaged with a ring gear, which in turn rotates a differential case including a number of planet gears or bevel gears. The pinion gear is often coupled with a pinion shaft supported within a carrier housing by one or more pinion bearings. In many applications, lubricating the pinion bearings is necessary for optimum performance thereof. However, the resistance caused by the lubricant in the bearings is known to be a source of system power loss that degrades fuel economy.

The present subject matter discloses a lubricant regulating system for regulating the volume of lubricant distributed to the pinion bearings of an axle assembly in a simple and cost effective manner. The system reduces churning losses by lowering the dynamic lubricant level in the axle assembly without having a negative impact on lubricant life or lubricant of the pinion bearings.

SUMMARY

Provided herein is an axle assembly, including: a carrier housing defining an interior cavity; a pinion shaft rotatably supported in the carrier housing by at least one bearing; a lubricant channel disposed in the carrier housing, the lubricant channel having a first end in fluid communication with the at least one bearing and a second end in fluid communication with the interior cavity; and a lubricant controller at least partially disposed in the lubricant channel, wherein the lubricant controller includes a lubricant capture portion.

In some embodiments, the lubricant channel includes a lubricant catch extending perpendicular to the lubricant channel into the carrier housing at the second end of the lubricant channel.

In some embodiments, the lubricant controller includes a lubricant collection portion and a lubricant controller body, wherein the lubricant capture portion is connected to the lubricant collection portion.

In some embodiments, the lubricant collection portion extends perpendicular to the lubricant controller body.

In some embodiments, the lubricant controller body is positioned in the lubricant channel and the lubricant collection portion is at least partially disposed within the lubricant catch.

In some embodiments, the lubricant controller further includes a retaining surface, a first wall, a second wall and the lubricant collection portion includes a third wall, wherein the retaining surface extends from the lubricant controller body to the lubrication collection portion, wherein the first wall extends upward from the retaining surface and connects to the lubricant controller body, wherein the second wall extends up from the retaining surface and connects to the lubricant controller body and the third wall, wherein the third wall connects to the second wall and extends the length of the lubricant collection portion.

In some embodiments, the lubricant capture portion extends from the third wall.

In some embodiments, the lubricant capture portion further includes a plurality of vertically disposed fins.

In some embodiments, the fins include a tapered geometry whereby the fins have a smaller width at a bottom thereof.

In some embodiments, the lubricant collection portion further includes a collection lip portion and a trough, wherein the trough connects the third wall to the collection portion lip, and wherein the collection portion lip includes an upward extending portion from the trough.

In some embodiments, the lubricant controller further includes a screen that extends from the third wall to the collection portion lip.

In some embodiments, the screen is a wire mesh screen.

In some embodiments, the screen is a molded polymeric screen.

In some embodiments, lubricant channel and the lubricant catch are integral with the carrier housing.

In some embodiments, the lubricant control body includes an aperture disposed therethrough.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF EMBODIMENTS

Figure 1:
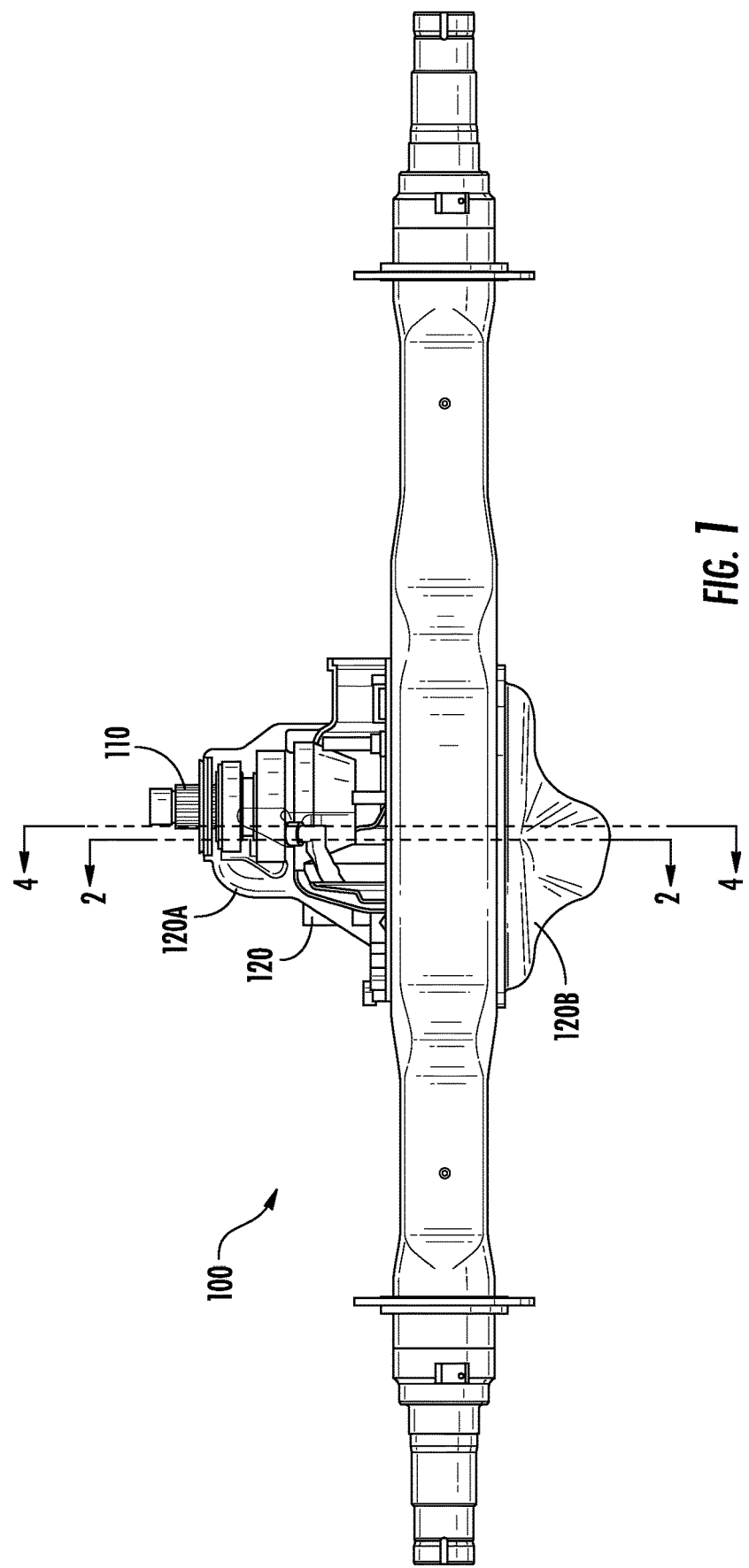
FIG. 1 is a top view of an axle assembly according to an embodiment of the presently disclosed subject matter.

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 2:
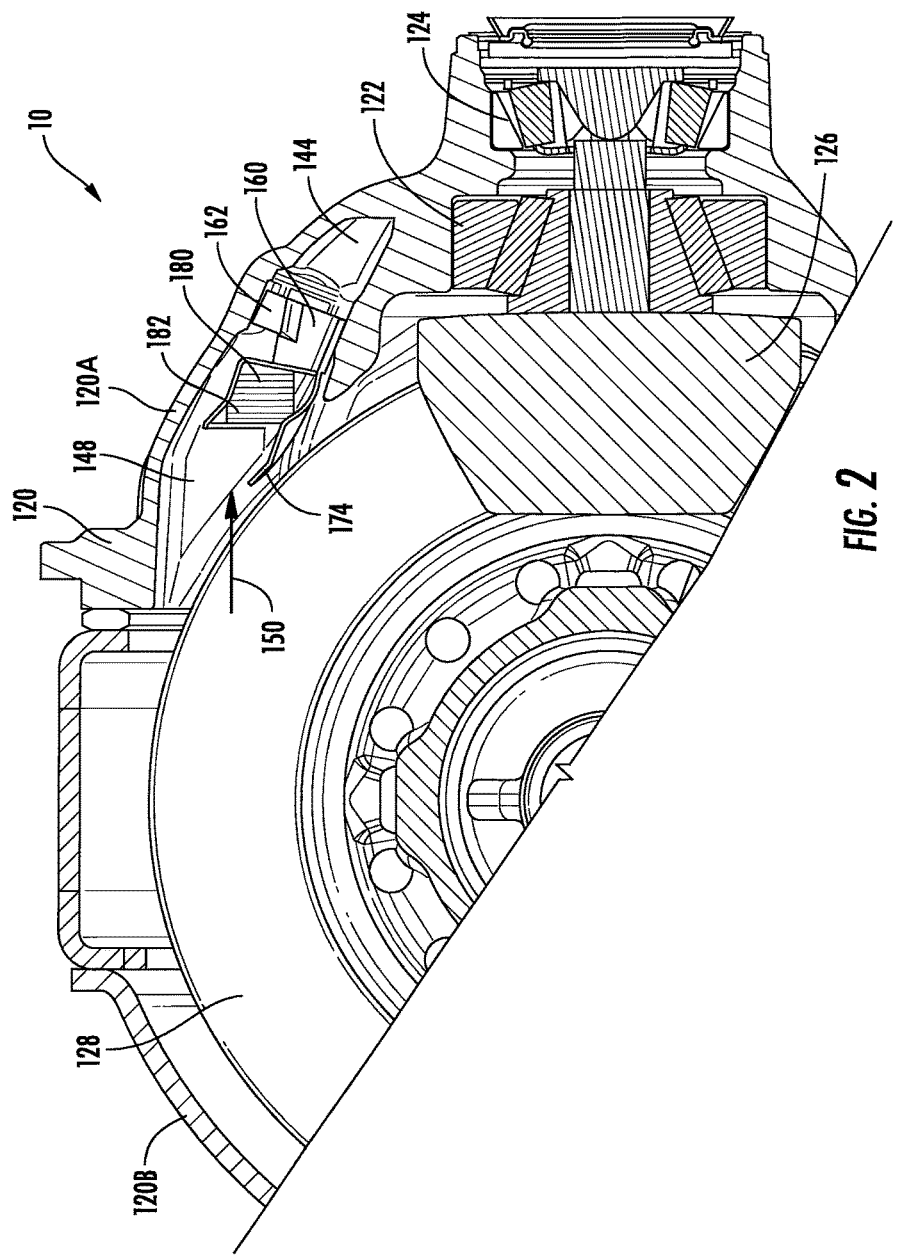
FIG. 2 is a cross-sectional view of a portion of the axle assembly of FIG. 1 along line 2-2.

As illustrated in FIGS. 1 and 2, provided herein is a lubricant regulating system 10. In some embodiments, the lubricant regulating system 10 is used with an axle assembly 100.

As shown in FIG. 1, in some embodiments, the lubricant regulating system 10 is used in a banjo-style axle assembly 100; however, the lubricant regulating system 10 is not limited to use with the axle assemblies described herein. Instead, the lubricant regulating system 10 may be utilized with axle assemblies of other shapes, sizes, orientations, and designs.

The lubricant regulating system 10 will be described in connection with an axle assembly of a motor vehicle (not depicted). It would be understood by one having skill in the art that the various embodiments of the lubricant regulating system 10 described herein may have applications to heavy vehicles, light vehicles, commercial vehicles, and off-highway vehicles. Furthermore, it would be understood by one having skill in the art that these embodiments could have industrial, military, and aerospace applications, as well as applications in passenger, electric, and autonomous or semi-autonomous vehicles.

In one embodiment, the axle assembly 100 includes a pinion shaft 110. The pinion shaft 110 is rotatably supported in a carrier housing 120 by a pair of spaced apart pinion bearings 122, 124. A pinion gear 126 is disposed on the pinion shaft 110. Coupled to the pinion shaft 110 opposite the pinion gear 126 is a drive shaft or input shaft (not depicted). The pinion shaft 110 receives power from a source of rotation power (not depicted) such as, but not limited to, a transmission, a motor/generator, or an engine coupled by the drive shaft. The pinion shaft 110 transfers rotational drive to a ring gear 128 via driving engagement of the pinion gear 126 and the ring gear 128.

The axle assembly 100 includes a differential assembly 130. The differential assembly 130 is provided to allow axle half shafts (and the wheels supported on shafts) to rotate at different speeds. Various differential assemblies are known in the art and could be used herein. A conventional differential assembly is disposed within housing may include a pinion gear, a ring gear, a differential case, a spider, and differential gears.

Figure 3:
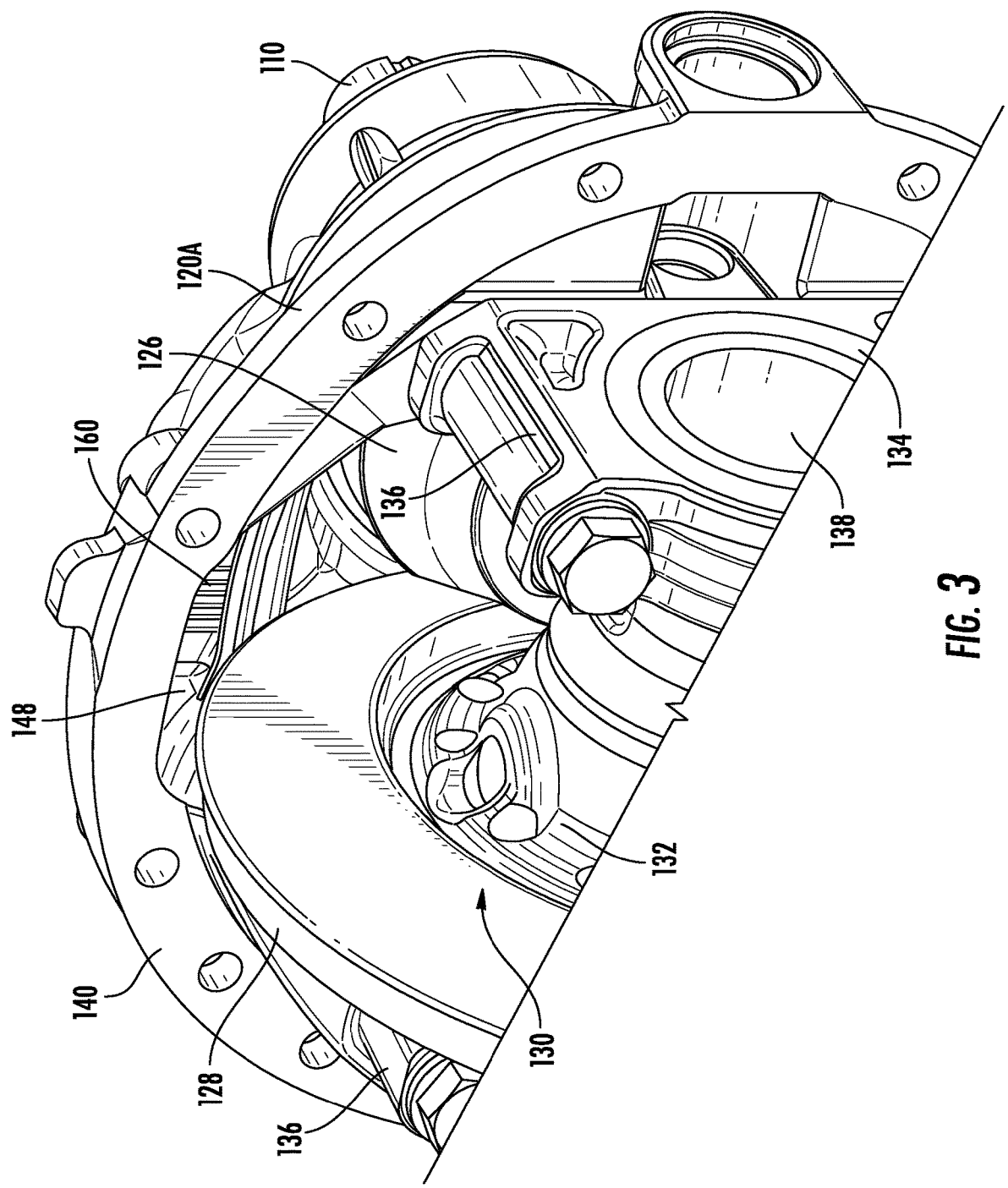
FIG. 3 is a perspective view of a portion of the axle assembly of FIG. 1.

As illustrated in FIG. 3, in some embodiments, the axle assembly 100 includes a differential assembly 130 housed in a differential case 132. The differential case 132 may be constructed of a single piece or it may be constructed of multiple pieces joined together by a plurality of bolts.

The differential case 132 may be mounted for rotation within the carrier housing 120 via a pair of differential bearings 134. The differential bearings 134 may be coupled with the carrier housing 120 via a pair of differential bearing caps 136. Additional bearings, bearing cups and bearing cones, or other antifriction means known to those skilled in the art are well within the scope of the disclosure.

The differential case 132 is coupled to the ring gear 128, and rotates therewith. The differential case 132 may be coupled with the ring gear 128 in a conventional manner, including via a plurality of mechanical fasteners or welding allowing for rotation.

In one embodiment, the differential case 132 includes a hollow interior. A pair of cross shafts (not depicted) extend through the differential case 132 hollow interior and are coupled at their ends to the differential case 132. Differential pinion gears (not depicted) are mounted on the ends of the cross shaft. The differential pinion gears are in mesh with side gears (not depicted) within the differential case 132.

The differential assembly 130 may further include a retaining bolt (not depicted) which secures the cross shafts in the differential case 132.

The differential assembly 130 transmits power to left and right side axle half shafts via the side gears. The side gears include splines in mesh with ends of the axle half shafts. The differential case 132 further includes a pair of shaft bores 138. The axle half shafts are inserted through the bores 138 and mesh with the side gear splines.

In some embodiment, the axle half shafts are secured in their position in the differential case 132 by c-clips (not depicted) inserted into grooves in the shafts. In some embodiments, the axle half shafts rotationally mounted within the differential case 132 on at least two bearings (not shown).

As illustrated in FIGS. 1-3, in some embodiments, the carrier housing 120 includes a forward portion 120A and a carrier housing cover 120B. The forward portion 120A and the carrier housing cover 120B are attached to opposite sides of an axle housing 100A. In some embodiments the carrier housing cover 120B is an integral piece of the axle housing 100A.

The forward portion 120A and the carrier housing cover 120B are be disposed in opposite relative positions depending on whether the axle assembly 100 is a front or rear axle assembly of a vehicle.

In some embodiments, the forward portion 120A includes a flange 140 for coupling the carrier housing cover 120B or axle housing 100A to the forward portion 120A. The flange 140 can include a plurality of apertures for securing the forward portion 120A to the carrier housing cover 120B or axle housing 100A via fasteners, bolts, etc.

The carrier housing forward portion 120A and the carrier housing cover 120B define a space or interior cavity wherein the differential assembly 130 is disposed within the axle assembly 100.

Referring to FIG. 2, the forward portion 120A and the carrier housing cover 120B define a lubricant sump (not depicted). The lubricant sump is a portion of the carrier housing 120 and interior cavity thereof where the lubricant disposed therein collects. In some embodiments, the lubricant sump is located in the lower portion of the carrier housing 120; however, the location of the lubricant sump will vary depending on the the amount of lubricant in the axle assembly 100.

The ring gear 128 is partially disposed in a volume of lubricant located in the lubricant sump. As the ring gear 128 rotates through the lubricant in the lubricant sump, teeth of the ring gear 128 carry a volume of the lubricant thereon.

Figure 4:
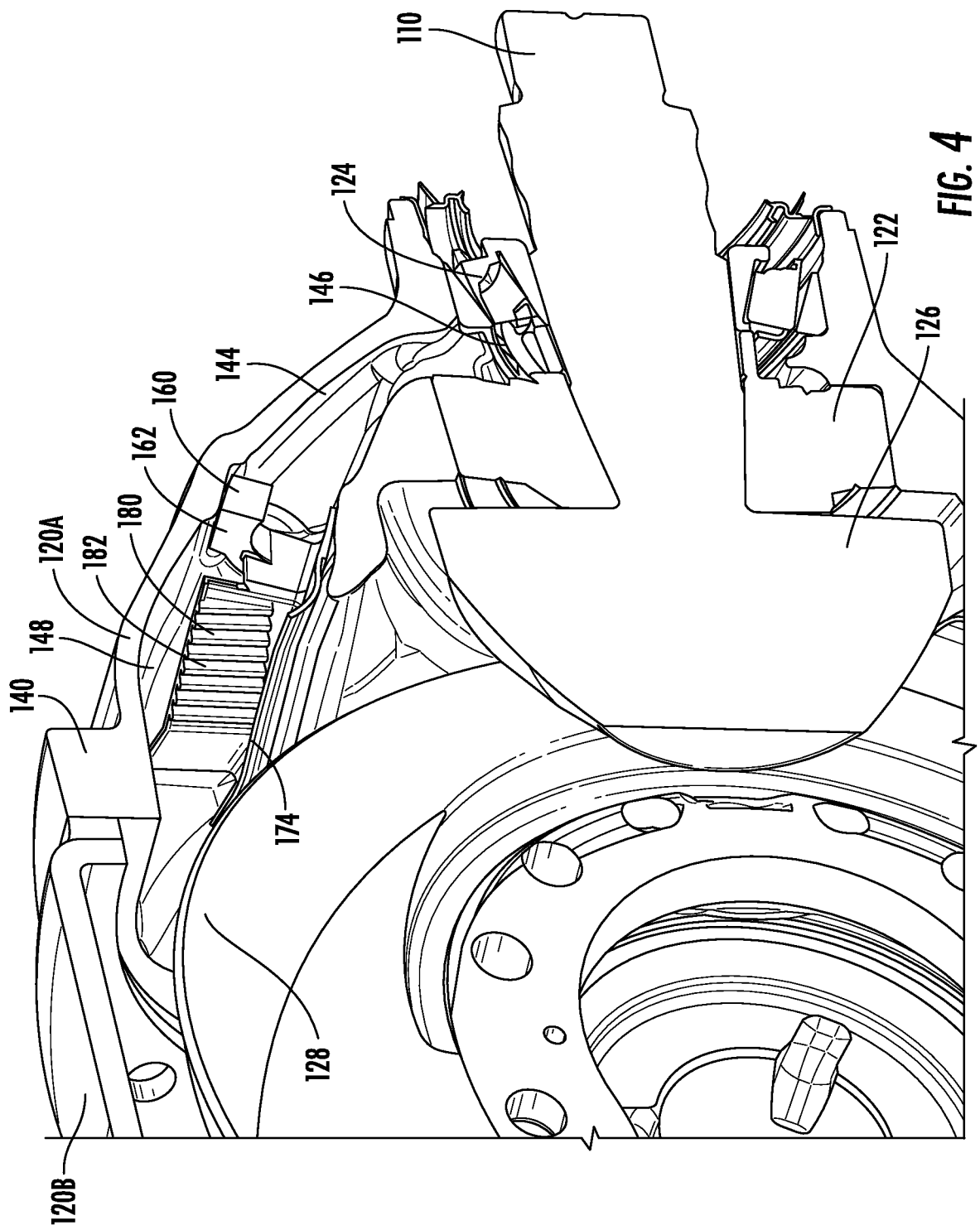
FIG. 4 is a perspective view of a cross-section of the axle assembly of FIG. 1.
Figure 5:
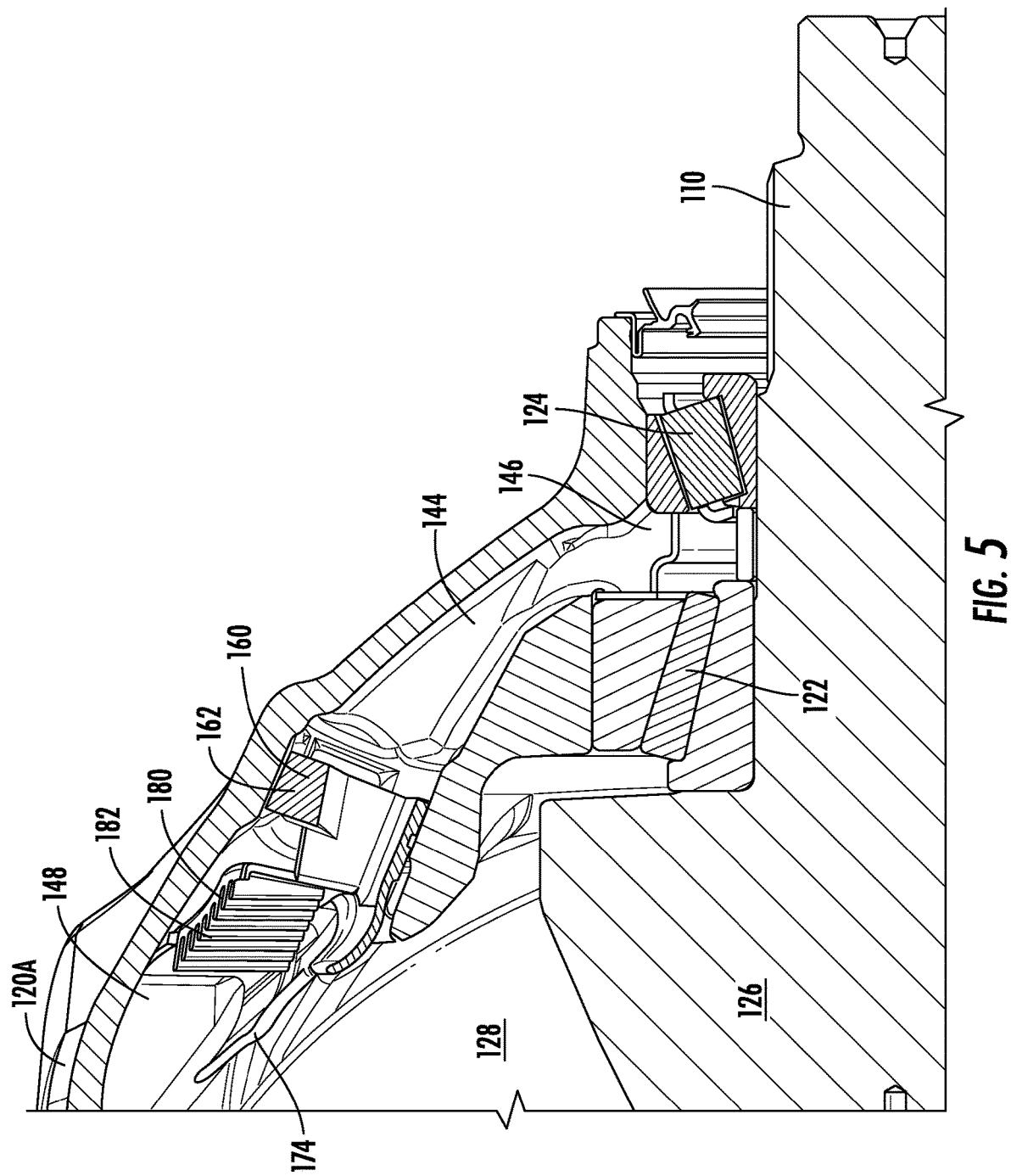
FIG. 5 is a side view of a portion of the cross-section of FIG. 4.

As illustrated in FIGS. 2, 4, and 5, the forward portion 120A includes a lubricant channel 144. The lubricant channel 144 is positioned in the forward portion 120A such that it provides fluid communication between the interior cavity of the carrier housing 120 at one end and a pinion bearing cavity 146 at least partially disposed between the pinion bearings 122, 124 at a second end.

In some embodiments, the lubricant channel 144 is positioned above the pinion gear 126 and adjacent the ring gear 128. The lubricant channel 144 is positioned such that lubricant carried by the ring gear 128 from the lubricant sump may be splashed into the the lubricant channel 144.

In some embodiments, the lubricant channel 144 is integral with the carrier housing 120. In some embodiments, the lubricant channel 144 is produced via casting during manufacture of the carrier housing 120. However, the lubricant channel 144 may also be produced after the carrier housing 120 is cast, via machining such as, but not limited to, boring, drilling, or electrochemical machining.

The lubricant channel 144 may include a downward angled surface from the interior of the carrier housing 120 to the pinion bearing cavity 146. The angle surface may be at numerous angles including, but not limited to, angles ranging from 0-180°. Further, the lubricant channel 144 may include a number of portions and surfaces disposed at multiple different angles with respect to each other to control the flow of lubricant through the lubricant channel 144 to the pinion bearing cavity 146.

In some embodiments, the width of the lubricant channel 144 decreases as from the interior of the carrier housing 120 to the pinion bearing cavity 146. However, it is appreciated that the size of the lubricant channel 144 may vary as required to control the flow of lubricant to the pinion bearing cavity 146.

In some embodiment, the carrier housing forward portion 120A includes a lubricant catch 148. The lubricant catch 148 is in fluid communication with the lubricant channel 144.

In some embodiments, the lubricant catch 148 is positioned at the end of the lubricant channel 144 in fluid communication with the interior cavity of the carrier housing 120. In some embodiments, the lubricant catch 148 is a recessed chamber that extends perpendicular to the lubricant channel 144 into the forward portion 120A.

In some embodiments, the lubricant catch 148 is integral with the carrier housing 120. In some embodiments, the lubricant catch 148 is integral with the lubricant channel 144.

In some embodiments, the lubricant catch 148 includes a generally rectangular-parallelepiped geometry, having an open side for receiving lubricant from the lubricant channel 144. However, the lubricant catch 148 may include any shape capable of receiving a predetermined volume of lubricant.

In other embodiments, the lubricant catch 148 may include, but is not limited to, a generally spherical, pyramidal, cylindrical, or parallelepipedal geometry having an opening for receiving lubricant.

When the ring gear 128 rotates through the lubricant in the lubricant sump, the lubricant carried by the teeth of the ring gear 128, or a volume thereof, is impelled outwardly by rotation of the ring gear 128.

Referring now to FIG. 2, the lubricant is slung against the carrier housing 120 and into the lubricant channel 144 and lubricant catch 148 as illustrated by an oil particle vector 150.

In some embodiments, as illustrated in FIGS. 2-5, a lubricant controller 160 is disposed in the lubricant channel 144 to regulate the lubricant flow rate to the pinion bearing cavity 146. By regulating the lubricant flow rate to the pinion bearing cavity 146, the pinion bearings 122, 124 are required to pump a smaller volume of lubricant through their rollers reducing churning and friction losses, thereby reducing the power consumption of the axle assembly 100.

As illustrated in FIGS. 2, 4, 5, and 6, in some embodiments, the lubricant controller 160 includes a regulator body 162 having a generally cylindrical shape. However, the shape of the regulator body 162 may be any shape which correlates to the shape of the lubricant channel 144; for example, the shape of a cross-section of the lubricant channel 144 and the regulator body 162 may be, but are not limited to, circular, rectangular, triangular, or hexagonal.

A portion of the lubricant controller 160 may be in sealing engagement with the lubricant channel 144 to mitigate against lubricant passing between the lubricant controller 160 and the lubricant channel 144.

In some embodiments, the lubricant controller 160 includes a retainer surface 164 oriented in a plane generally perpendicular to the longitudinal axis of the lubricant controller body 162.

In some embodiments, the retaining surface 164 may also be positioned in an angled plane. Thus, the retaining surface 164 may be a downward angled surface toward the lubricant controller body 160. The retaining surface 164 may be at numerous angles including, but not limited to, angles ranging from 0-180°. Further, the retaining surface 164 may include a number of portions and surfaces disposed at multiple different angles with respect to each other to control the flow of lubricant through the lubricant controller to the lubricant controller body 162.

In some embodiments, the retaining surface 164 includes a plurality of surfaces and the surfaces are positioned at a series of angles relative to the longitudinal axis of the lubricant controller 160.

Persons having skill in the art will recognize that the retaining surface 164 may include any geometry which mitigates against lubricant flow therethrough, such as, but not limited to, a polyhedron, a disc, a cylinder, a rectangular prism, a triangular prism, a hexagonal prism, a pyramid, a cone, a sphere, a hemisphere, or any combination or series thereof.

In some embodiments, the lubricant controller 160 includes a lubricant collection portion 166. The lubricant collection portion 166 is coupled with the body 162 and the retaining surface 164.

In some embodiments, the lubricant collection portion 166 includes a first wall 168 and a second wall 170. The collection portion first and second walls 168, 170 may extend from the lubricant controller body 162 toward the ring gear 128. The collection portion first and second walls 168, 170 may be coupled with the retaining surface 164. In some embodiments, the first wall 168 extends longer than the second wall 170.

In some embodiments, the lubricant collection portion 166 includes a third wall 172. The third wall 172 is coupled with the second wall 170 and extends therefrom in a direction generally transverse to the general plane of the second wall 170. In some embodiments, the third wall 172 may have a greater height than the first and/or second walls 168, 170.

The collection portion 166 also includes a trough 176. The trough 176, or a portion thereof, may include a gradient sloping downward toward the first wall 168 and the retaining surface 164. In some embodiments, the trough 176 extends essentially perpendicular from the third wall 172 and perpendicular to the retaining surface 164.

In some embodiments, the trough 176 and the retaining surface 164 are connected together as a smooth integral surface.

In some embodiments, the collection portion 166 further includes a rearward disposed collection portion lip 174 which may extend the length thereof. The collection portion lip 174 includes an upward extending portion from the trough 176 disposed at a predetermined angle to facilitate the acceptance and retention of lubricant flung by the ring gear 128. Further, the collection portion lip 174 facilitates the retention of lubricant delivered to the collection portion 166 during service of the axle assembly 100 at increased pinion shaft 110 angles.

In some embodiments, the lubricant controller 160 includes an aperture 178 disposed through the retaining surface 164.

Figure 6:
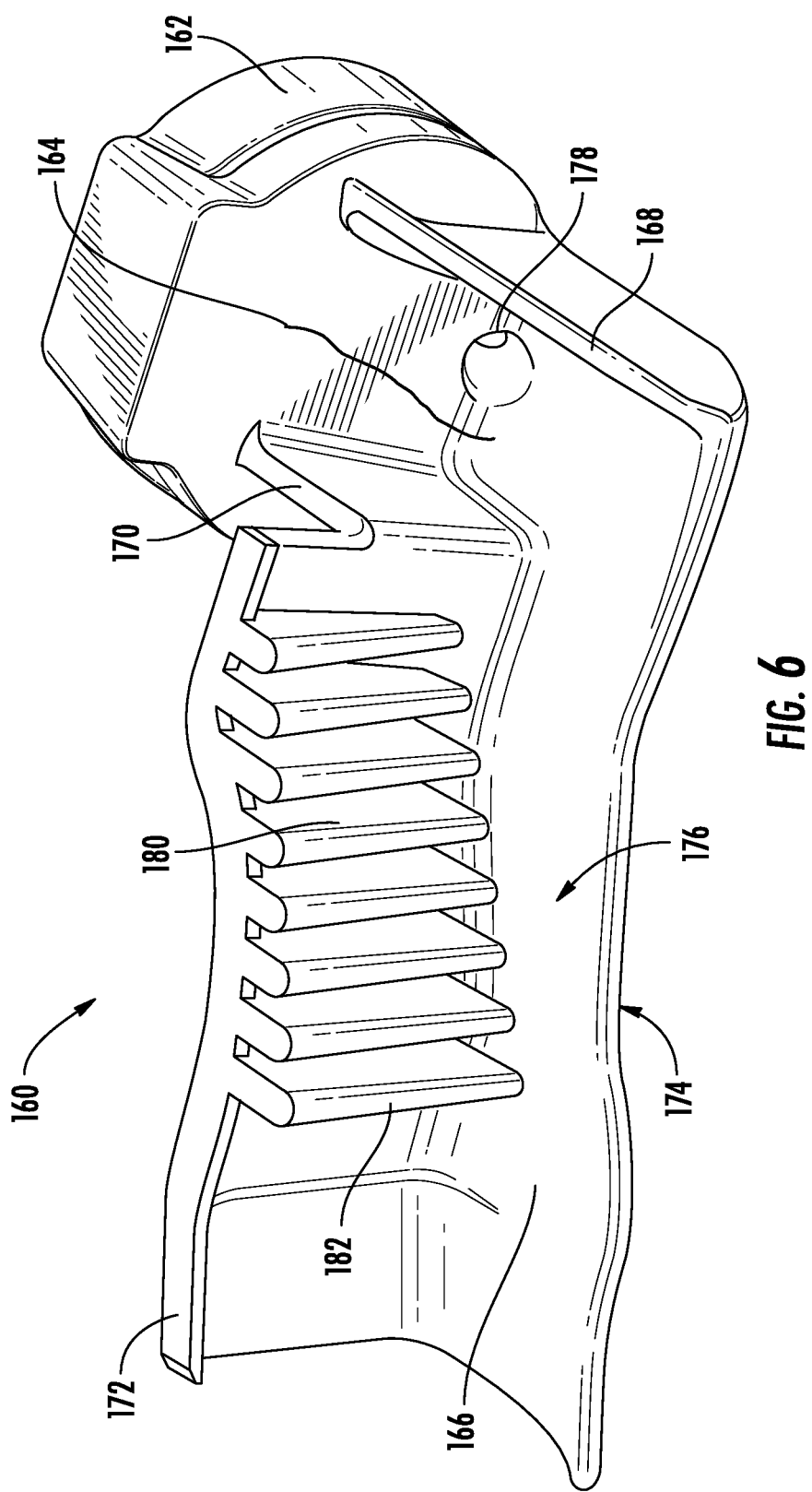
FIG. 6 is a perspective view of a portion of the axle assembly of FIG. 1.

In some embodiments, as illustrated in FIG. 6, the aperture 178 is disposed through both the retaining surface 164 and the trough 176 at an angle to the horizontal plane.

The diameter and size of the aperture 178 may vary, depending on the application and desired flow rate of lubricant. The sealing engagement of the lubricant controller 160 with the lubricant channel 144 and the position of the retaining surface 164 mitigate against undesired lubricant flow in the lubricant channel 144; however, the aperture 178 permits lubricant to flow through the lubricant channel 144 at a predetermined rate.

The trough 176 may include a plurality of surfaces that are positioned at a series of angles relative to the longitudinal axis of the lubricant controller 160. The gradient of the trough 176 directs lubricant to the aperture 178.

In some embodiments, as illustrated in FIGS. 2 and 4-7, the lubricant collection portion 166 includes a lubricant capture portion 180.

In certain embodiments of the axle assembly 100, the ring gear 128 propels the lubricant at such a velocity that upon impact with the carrier housing 120 or with the lubricant collection portion 166, the lubricant breaks apart into small droplets that are deflected in practically every direction. The high velocity lubricant being deflected in every direction has the effect of reducing the lubricant directed to the lubricant controller aperture 178. The lubricant capture portion 180 may thus be utilized to reduce or prevent deflection of lubricant particles away from the lubricant controller collection portion 166.

In some embodiment, as illustrated in FIGS. 2 and 4-6, the lubricant capture portion 180 includes a plurality of vertically disposed fins 182.

In some embodiments, the fins 182 extend vertically from the top of the third wall 172 to toward the collection portion lip 174.

In some embodiment, the fins 182 do not extend all the way to the entire width of the trough 176 to facilitate flow of the lubricant toward the aperture 178.

The fins 182 may be tapered such that the fins 182 are thicker at their upper end, where they meet with the top of the third wall 132 relative to their lower end. The taper of the fins 182 decreases the spacing of the fins 182 at the top of the lubricant capture portion 180 such that fewer lubricant droplets are able to deflect upward and out of the lubricant collection portion 166.

In some embodiments, the distance with which the fins 182 project from the third wall 172 decreases as the fins 182 are disposed more proximate the lubricant controller body 162, i.e. to the overall length and width of the individual fins decreases as the fins gets closer to the lubricant controller body 162.

The fins 182 accept the lubricant propelled by the ring gear 128 and disrupt the lubricant splatter and deflection upon impact, thereby reducing the volume of lubricant deflected away from the lubricant collection portion 166. Gravity acts on the lubricant captured by the fins 182 causing the lubricant to flow down and between the fins 182 into the trough 176.

In some embodiments, the height of the third wall 172 varies along the length of the trough 176.

In some embodiments, the height of the third wall 172 is relatively consistent as depicted in FIG. 6.

In some embodiments, the capture portion 180 is cast directly into the interior surface of the carrier housing forward portion 120A.

In some embodiments, the capture portion 180 may include a perforated stamping portion. The perforated stamping may be disposed between the third wall 172 and the lip 174. Lubricant propelled by the ring gear 128 impacts on the perforated stamping to slow down the lubricant and prevent deflection and splatter of the lubricant. The lubricant then flows into the trough 176.

In some embodiments, the lubricant controller 160 is positioned in the lubricant channel 144 such that the lubricant controller body 162 is positioned in the lubricant channel 144 and the lubricant collection portion 166 is positioned at least partially within the lubricant catch 148 as show in FIG. 4.

During operation of the differential assembly, lubricant may be propelled by the ring gear 128 from the carrier housing 120 into the lubricant capture portion 180. From the lubricant capture portion 180, the lubricant flows into the lubrication collection portion 166. The lubricant then flows down the trough 176 and through the aperture 178. From the aperture 178, the lubricant flows into the carrier housing forward portion lubricant channel 144 and into the bearing cavity 146. The lubricant passes through the bearings 122, 124, and the lubricant returns to the carrier housing lubricant sump.

Figure 7:
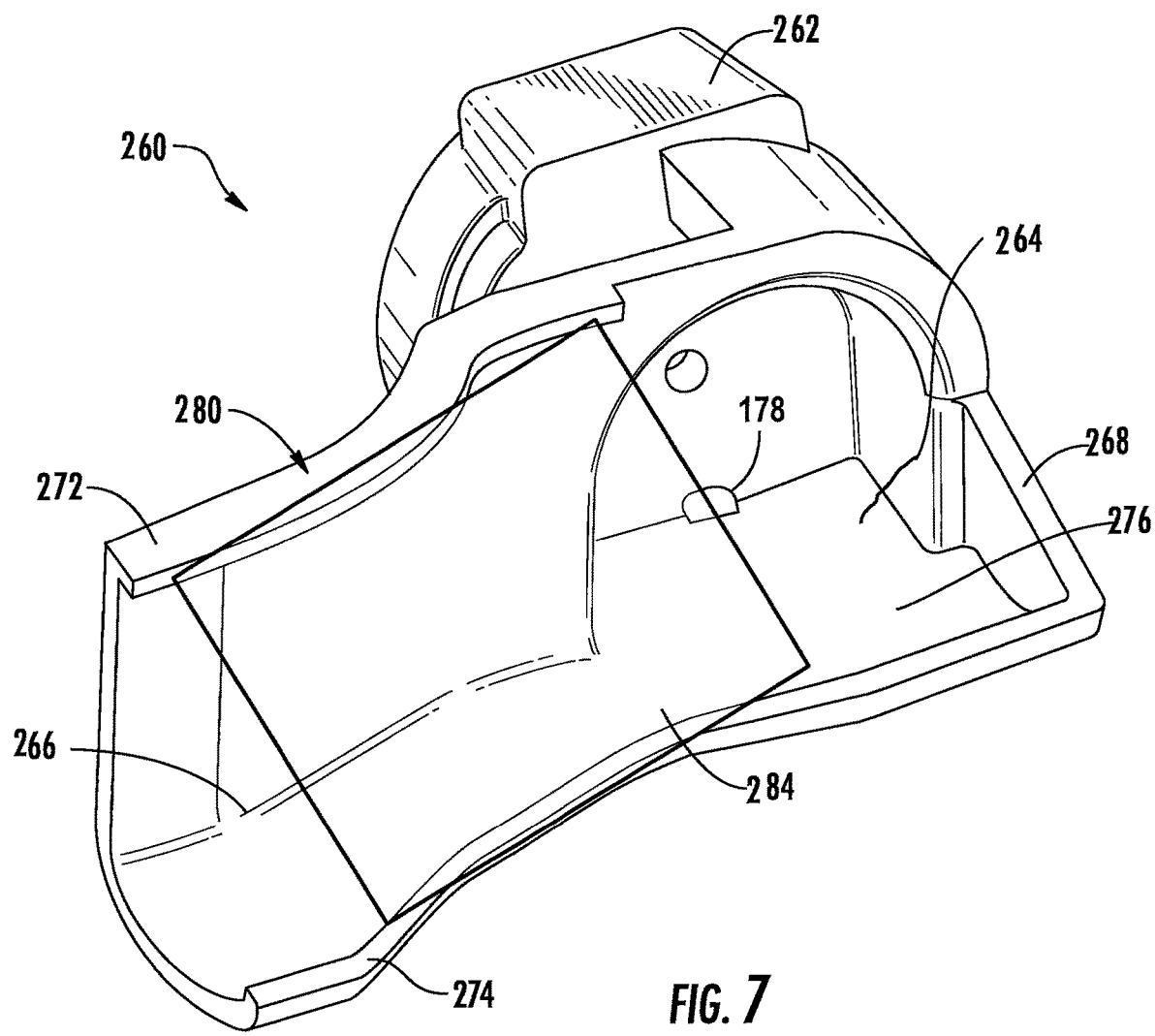
FIG. 7 is a perspective view of another embodiment of a portion of the axle assembly of FIG. 1.

FIG. 7 depicts another preferred embodiments of a lubricant controller. Similar features of the embodiments are numbered similarly in series, with the exception of the features specifically noted.

In another embodiment, as illustrated in FIG. 7, the lubricant controller 260 includes a lubricant controller capture portion 280 includes a screen 284 coupled with the lubricant collection portion 266.

In some embodiments, the screen 284 is disposed between an upper portion of the third wall 272 and the lip 274. Lubricant propelled by the ring gear 128 impacts on the screen 284 slowing down and or disrupting the lubricant flow. Gravity causes the lubricant to flow into the trough 276 after impacting on the screen 284.

In some embodiments, the screen 284 is a wire mesh screen. In some embodiment, the screen 284 is a molded screen. The molded screen may be manufactured from a polymeric material.

In some embodiments, as depicted in FIG. 7, the third wall 272 extends over the retaining surface 164 connecting to both the second wall 270 and first wall 268.

It is also an object of the present disclosure to provide the following aspects:

Aspect 1. An axle assembly, including:
a carrier housing defining an interior cavity;
a pinion shaft rotatably supported in the carrier housing by at least one bearing;
a lubricant channel disposed in the carrier housing, the lubricant channel having a first end in fluid communication with the at least one bearing and a second end in fluid communication with the interior cavity; and
a lubricant controller at least partially disposed in the lubricant channel, wherein the lubricant controller includes a lubricant capture portion.

Aspect 2. The axle assembly of Aspect 1, wherein the lubricant channel includes a lubricant catch extending perpendicular to the lubricant channel into the carrier housing at the second end of the lubricant channel.

Aspect 3. The axle assembly of Aspect 1, wherein the lubricant controller includes a lubricant collection portion and a lubricant controller body, wherein the lubricant capture portion is connected to the lubricant collection portion.

Aspect 4. The axle assembly of Aspect 3, wherein the lubricant collection portion extends perpendicular to the lubricant controller body.

Aspect 5. The axle assembly of Aspect 3, wherein the lubricant controller body is positioned in the lubricant channel and the lubricant collection portion is at least partially disposed within the lubricant catch.

Aspect 6. The axle assembly of Aspect 3, wherein the lubricant controller further includes a retaining surface, a first wall, a second wall and the lubricant collection portion includes a third wall, wherein the retaining surface extends from the lubricant controller body to the lubrication collection portion, wherein the first wall extends upward from the retaining surface and connects to the lubricant controller body, wherein the second wall extends up from the retaining surface and connects to the lubricant controller body and the third wall, wherein the third wall connects to the second wall and extends the length of the lubricant collection portion.

Aspect 7. The axle assembly of Aspect 6, wherein the lubricant capture portion extends from the third wall.

Aspect 8. The axle assembly of Aspect 1, wherein the lubricant capture portion further includes a plurality of vertically disposed fins.

Aspect 9. The axle assembly of Aspect 1, wherein the fins include a tapered geometry whereby the fins have a smaller width at a bottom thereof.

Aspect 10. The axle assembly of Aspect 6, wherein the lubricant collection portion further includes a collection lip portion and a trough, wherein the trough connects the third wall to the collection portion lip, and wherein the collection portion lip includes an upward extending portion from the trough.

Aspect 11. The axle assembly of Aspect 10, wherein lubricant controller further includes a screen that extends from the third wall to the collection portion lip.

Aspect 12. The axle assembly of Aspect 11, wherein the screen is a wire mesh screen, Aspect 13. The axle assembly of Aspect 11, wherein the screen is a molded polymeric screen.

Aspect 14. The axle assembly of Aspect 2, wherein the lubricant channel and the lubricant catch are integral with the carrier housing.

Aspect 15. The axle assembly of Aspect 2, wherein the lubricant control body includes an aperture disposed therethrough.

One or more features of the embodiments described supra may be combined to create additional embodiments which are not depicted. While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed:

1. An axle assembly, comprising:
a carrier housing;
a pinion shaft rotatably supported in the carrier housing by at least one bearing;
a lubricant channel disposed in the carrier housing, wherein the lubricant channel has a first end in fluid communication with the at least one bearing and a second end in fluid communication with an interior cavity of the carrier housing;
a lubricant controller at least partially disposed in the lubricant channel, wherein the lubricant controller comprises a lubricant capture portion, a retaining surface, a first wall, a second wall, and a third wall;
wherein the retaining surface extends from a lubricant controller body to the lubrication collection portion;
wherein the first wall extends upward from the retaining surface and connects to the lubricant controller body;
wherein the second wall extends up from the retaining surface and connects to the lubricant controller body and the third wall; and
wherein the third wall connects to the second wall and extends the length of the lubricant collection portion.

2. The axle assembly of claim 1, wherein the lubricant channel includes a lubricant catch extending substantially perpendicular to the lubricant channel into the carrier housing at the second end of the lubricant channel.

3. The axle assembly of claim 2, wherein the lubricant channel and the lubricant catch are integrally formed with the carrier housing.

4. The axle assembly of claim 2, wherein the lubricant control body includes an aperture disposed therethrough.

5. The axle assembly of claim 1, wherein the lubricant controller includes a lubricant collection portion and a lubricant controller body, wherein the lubricant capture portion is connected to the lubricant collection portion.

6. The axle assembly of claim 5, wherein the lubricant collection portion extends substantially perpendicular to the lubricant controller body.

7. The axle assembly of claim 5, wherein the lubricant controller body is positioned within the lubricant channel and the lubricant collection portion is at least partially disposed within the lubricant catch.

8. The axle assembly of claim 1, wherein the lubricant capture portion extends from the third wall.

9. The axle assembly of claim 1, wherein the lubricant capture portion further includes a plurality of vertically disposed fins.

10. The axle assembly of claim 1, wherein the plurality of vertically disposed fins include a tapered geometry whereby the plurality of vertically disposed fins have a smaller width at a bottom thereof.

11. The axle assembly of claim 1, wherein the lubricant collection portion further includes a collection lip portion and a trough;
wherein the trough connects the third wall to the collection portion lip; and
wherein the collection portion lip includes an upward extending portion from the trough.

12. The axle assembly of claim 11, wherein lubricant controller further includes a screen that extends from the third wall to the collection portion lip.

13. The axle assembly of claim 12, wherein the screen is a wire mesh screen.

14. The axle assembly of claim 12, wherein the screen is a molded polymeric screen.

15. The axle assembly of claim 11, further comprising a plurality of vertically disposed fins and wherein the plurality of vertically disposed fins do not extend the entire width of the trough.

16. The axle assembly of claim 1, further comprising a plurality of vertically disposed fins extending vertically from a top of the third wall toward the collector portion lip.

17. The axle assembly of claim 1, wherein the lubricant capture portion further comprises a plurality of vertically disposed fins integrally formed as part of the lubricant capture portion.

* * * * *